(12) United States Patent
Rittner et al.

(10) Patent No.: US 8,882,033 B2
(45) Date of Patent: Nov. 11, 2014

(54) PASSENGER CABIN EMERGENCY OXYGEN DEVICE

(75) Inventors: Wolfgang Rittner, Ahrensbok (DE); Rudiger Meckes, Berkenthin (DE); Gunter Boomgaarden, Scharbeutz (DE); Hasso Weinmann, Lubeck (DE)

(73) Assignee: Zodiac Aerotechnics, Plaisir (FR)

( * ) Notice: Subject to any disclaimer, the term of this patent is extended or adjusted under 35 U.S.C. 154(b) by 444 days.

(21) Appl. No.: 13/363,531

(22) Filed: Feb. 1, 2012

(65) Prior Publication Data

US 2012/0205491 A1 Aug. 16, 2012

Related U.S. Application Data

(60) Provisional application No. 61/441,318, filed on Feb. 10, 2011.

(51) Int. Cl.
*B64D 11/00* (2006.01)
*A62B 7/14* (2006.01)

(52) U.S. Cl.
CPC . *A62B 7/14* (2013.01); *B64D 11/00* (2013.01); *Y02T 50/46* (2013.01)
USPC ............. 244/118.5; 128/202.256; 128/204.29

(58) Field of Classification Search
USPC ........................................... 244/118.6, 118.5
See application file for complete search history.

(56) References Cited

U.S. PATENT DOCUMENTS

| | | | |
|---|---|---|---|
| 3,259,411 A * | 7/1966 | Griffiths | 292/113 |
| 3,503,394 A * | 3/1970 | Hotz et al. | 128/206.27 |
| 4,518,179 A * | 5/1985 | Fenner | 292/166 |
| 4,609,166 A * | 9/1986 | Brennan | 244/118.5 |
| 4,718,572 A * | 1/1988 | Gosse et al. | 220/324 |
| 5,803,062 A * | 9/1998 | Aulgur | 128/202.26 |
| 6,497,386 B2 * | 12/2002 | Martinez | 244/118.5 |
| 7,434,766 B2 * | 10/2008 | Pozzi et al. | 244/118.6 |
| 7,694,674 B2 * | 4/2010 | Crome et al. | 128/202.26 |
| 8,356,595 B2 * | 1/2013 | Schaeffer et al. | 128/204.29 |
| 8,387,618 B2 * | 3/2013 | Meckes et al. | 128/205.24 |

(Continued)

FOREIGN PATENT DOCUMENTS

| | | |
|---|---|---|
| EP | 2090335 A1 | 8/2009 |
| EP | 2168635 A1 | 3/2010 |
| WO | 8402279 A1 | 1/1984 |

OTHER PUBLICATIONS

European Search Report for EP111153950.8.

*Primary Examiner* — Christopher P Ellis
*Assistant Examiner* — Medhat Badawi
(74) *Attorney, Agent, or Firm* — Kilpatrick Townsend & Stockton LLP; Dean W. Russell, Esq.

(57) ABSTRACT

The Invention relates to a passenger cabin emergency oxygen device for an aircraft, comprising at least one electrically driven activation device for activating the emergency oxygen device, at least one energy storage device and a source of electrical energy. Said source of electrical energy and said energy storage device are coupled together for substantially constant energy transmission from the source of electrical energy to the energy storage device at a first energy level, an activation device and a controller are coupled together for signal transmission from the controller to the activation device, said activation device and said energy storage device are coupled together for energy transmission from the energy storage device to the activation device at a second energy level which is higher than the first energy level.

10 Claims, 8 Drawing Sheets

(56) References Cited

U.S. PATENT DOCUMENTS

| | | | |
|---|---|---|---|
| 8,474,456 B2* | 7/2013 | Rittner et al. | 128/204.26 |
| 8,573,216 B2* | 11/2013 | Gill | 128/206.27 |
| 2009/0084896 A1* | 4/2009 | Boucher et al. | 244/118.5 |
| 2010/0012123 A1* | 1/2010 | Rittner et al. | 128/204.21 |
| 2010/0319698 A1* | 12/2010 | Cannon | 128/204.21 |
| 2012/0222676 A1* | 9/2012 | Cannon | 128/205.13 |
| 2013/0149950 A1* | 6/2013 | Umlauft et al. | 454/76 |
| 2013/0220317 A1* | 8/2013 | Rittner et al. | 128/202.26 |

* cited by examiner

PASSENGER CABIN EMERGENCY OXYGEN DEVICE

CROSS-REFERENCE TO RELATED APPLICATION

This application claims the benefit of U.S. Provisional Application No. 61/441,318 filed on Feb. 10, 2011, the contents of which are incorporated herein by reference.

FIELD OF THE INVENTION

The invention relates to a passenger cabin emergency oxygen device for an aircraft, in particular for providing oxygen to passenger or crew of an aircraft. The invention further relates to a method for activating a passenger cabin emergency oxygen device for an aircraft in case of emergency. A further aspect of the invention is a method for operating a passenger cabin emergency oxygen device for an aircraft. Furthermore the invention relates to an aircraft comprising a plurality of emergency oxygen devices.

BACKGROUND OF THE INVENTION

Arrangements of such emergency oxygen devices of the aforementioned type are used for a number of purposes where temporary or permanent supply of oxygen to a human person is necessary. A particular field of application of such emergency oxygen devices is the field of aircraft, wherein a pressure drop within an aircraft flying at high altitudes may make it necessary to supply the passengers and the crew members with oxygen. Usually, an emergency oxygen device is provided for each crew member and each passenger or a group thereof and is usually arranged above the passenger. In case of an emergency, such emergency oxygen device is activated, for example automatically by a cabin pressure monitoring system or manually by a crew member, whereafter an oxygen mask connected via a hose to an oxygen source falls from above the passenger downwards and can be used by the passenger. The flow of oxygen may be started automatically, by activation of the system by the crew member or may be activated by a particular action undertaken by the passenger, e.g. by pulling the mask downwards himself to thus activate the device by a pulling force transferred via a hose guiding the oxygen flow or an additional lanyard coupled to the oxygen mask.

Emergency oxygen devices of the aforementioned type known from the state of the art are connected to the aircraft energy system and receive the energy needed to activate the emergency oxygen device from this aircraft energy system. In many emergency cases cabin pressure drop goes together with other defects on the aircraft, e.g. damage of a turbine or other damages. In such an emergency case it is essential to save as much energy as possible. The activation of a plurality of emergency oxygen devices in a passenger cabin of an aircraft may cause an undesirable high peak of energy consumption, which may cause a total breakdown of the aircraft energy system.

SUMMARY

The invention aims to provide a passenger cabin emergency oxygen device for an aircraft which overcomes at least some of the aforementioned drawbacks and provides better safety to a person supplied by the emergency oxygen device, in particular in case of a severe emergency situation.

According to a first aspect of the invention, this object is achieved by providing a passenger cabin emergency oxygen device for an aircraft as described beforehand, comprising at least one electrically driven activation device for activating the emergency oxygen device and at least one emergency storage device for storing electrical energy and supplying said electric energy to the at least one activation device and at least one controller adapted for receiving and processing a signal to activate the emergency oxygen device and a source of electrical energy, wherein said source of electrical energy and said energy storage device are coupled together for substantially constant energy transmission from the source of electrical energy to the energy storage device at a first energy level, wherein said activation device and said controller are coupled together for signal transmission from the controller to the activation device, wherein said activation device and said energy storage device are coupled together for energy transmission from the energy storage device to the activation device at a second energy level which is higher than the first energy level, wherein said activation device said energy storage device and said controller build one single unit adapted to be inserted into a roof element of an aircraft cabin interior.

According to this aspect of the invention, an emergency oxygen device is provided which omits high-peak energy transmission from the aircraft energy system to the emergency oxygen device in an emergency case. This allows simultaneous activation of multiple emergency oxygen devices in an aircraft without the risk of overload-induced breakdown of the energy system of the aircraft. Instead of receiving one high second level energy peak during an emergency case, the energy storage device receives a substantially constant low first level energy transmission from the source of electrical energy to store this energy. In an emergency case an emergency signal is sent to the controller, which upon receipt of such signal connects the electrically driven activation device with the energy storage device, so that the activation device may receive the required amount of energy from the energy storage device. The source of electrical energy herein is an interface adapted to connect the emergency oxygen device with an energy network of the aircraft and/or an energy harvesting element or the like integral within the emergency oxygen device. It is to be understood, that first level energy transmission herein has a lower energy level than second level energy transmission. Preferably first level energy transmission is lower than the energy transmission required by the activation device for activating the emergency oxygen device. In particular the ratio between first and second level is in the range of 1 to 60 according to the invention, no high-peak second level energy transmission from the aircraft energy system to the emergency oxygen device in case of emergency is required, which leads to a better safety of the aircraft, in particular in two cases: In case of an emergency sufficient energy from the energy storage device to the electrically driven activation device will be supplied so that all emergency oxygen devices may be activated. When no high-peak second level energy transmission from the aircraft energy system is required, the so saved energy may be supplied to other devices, like cockpit safety devices or the like.

As a surprising further advantage the invention serves the desire to provide an overall lightweight construction of the aircraft to reduce fuel consumption of the aircraft which is a general problem associated with modern aircrafts. Especially a reduction of weight of cabin interior elements is achieved. By supplying a substantially constant low first level energy transmission from an aircraft energy system to the energy storage device no extensive wiring adapted for high-peak second level energy transmission from the aircraft energy system to the electrically driven activation device is required, hence leading to an increase of the security of the aircraft.

A further surprising advantage is the reduction of manufacturing and overhauling costs. In a modern aircraft a high variety of interior design is desired. This results in the need for cabin interior elements like emergency oxygen devices or passenger units which are adapted to be implemented into the aircraft at different locations and in different numbers. Surprisingly according to this invention the aircraft, especially the cabin interior including the PSU, may be overhauled and modified later without substantial constructive work in case that the interior design is changed. In contrast, prior art emergency oxygen devices require extensive preparation or design work, isolating and installation in a course of the initial manufacturing as well as later overhaul and modification of an aircraft.

According to a first preferred embodiment said emergency oxygen device is adapted to receive and process an emergency signal, in particular an aircraft cabin decompression signal to set the activation device and the energy storage device into electrical connection. According to this embodiment, the controller is adapted to receive and process an emergency signal, while the energy storage device is adapted to receive and store a substantially constant low first level energy transmission from the source of electrical energy. When receiving the emergency signal, the controller sets the activation device and the energy storage device into communication so that electrical energy may flow from the energy storage device to the activation device enabling the emergency oxygen device to be activated. The activation device in this embodiment may comprise an electric motor, an electrically actuated switch, a solenoid switch or latch or an electrically actuated latch or the like. The controller in this embodiment may comprise a transistor or an electromagnet or the like adapted to set the energy storage device and the electrically driven activation device into electric communication. Cabin decompression herein refers to the ambient pressure inside an aircraft cabin. An aircraft may comprise a sensor which is adapted to measure the ambient pressure, which is the pressure inside the cabin of an aircraft. In case of a cabin pressure drop, the pressure difference between the cabin ambient pressure and the ambient pressure outside the aircraft lowers. However, preferably the cabin decompression signal is send in case the cabin ambient pressure falls under a predetermined level.

According to a further preferred embodiment of the emergency oxygen device said controller is adapted to receive said signal via a signal wire from a sender. While connecting the controller to a signal wire and coupling the activation device via the controller to the energy storage device, the signal wire may be designed with a small diameter. This leads to a reduction in weight of the aircraft. The signal wire is connected to a sensor which may comprise a sensor inside the aircraft, which supplies cabin decompression signal to the controller via the signal wire. The aircraft may comprise more than one of these sensors, e.g. four sensors distributed over the aircraft. This leads to a further reduction of wiring, since it is not necessary to lead the wire through the whole airplane.

According to a further preferred embodiment of the emergency oxygen device said source of electrical energy and said energy storage device are coupled together by means of said signal wire for an energy transmission at said first energy level. According to this embodiment a substantially constant low energy is transmitted via the signal wire from the source of electrical energy to the energy storage device and preferably also to the controller. This energy transmission may be of very low energy level so that the cross-section of the signal wire may be kept small. The energy storage device may accumulate the energy transmitted and supply this energy in case of an emergency to the activation device for activating the emergency oxygen device.

According to a further preferred embodiment of the emergency oxygen device, said controller is adapted to receive and process at least two different signals comprising an emergency signal for activating said activation device in an emergency case, and a test signal for activating said activation device in a test case. Emergency oxygen devices are an essential and life saving part of modern aircrafts. Thus it is essential to test, whether one emergency oxygen device is defect or not. According to this embodiment the controller may receive an emergency signal for activating said activation device in an emergency case. In this case the activation device is set into electrical communication with the energy storage device to activate the emergency oxygen device. The controller is also adapted to receive a test signal for activating said activation device in a test case. Such a test case may be a test case which is performed while maintaining the aircraft on ground. In such case the controller may set the activation device and the energy storage device into electrical communication to activate the emergency oxygen device. In one embodiment the controller is adapted to set the activation device and the energy storage device for short-time period into communication. In one alternative embodiment the controller comprises a signaling means, such as a light or a speaker, and in case the controller receiving the test signals, the controller is adapted to set the energy storage device into communication with the signaling means.

According to a further preferred embodiment of the emergency oxygen device said signal is characterized in a change of voltage and/or a change of frequency of an electrical current of said signal wire and preferably the change of voltage and/or the change of frequency signaling the emergency signal is different to the change of voltage and/or the change of frequency signaling the test signal. According to this embodiment the signal wire may be connected to the energy storage device for a substantially constant energy transmission from a source of electrical energy to the energy storage device at a first energy level. This transmission may be with a low first level voltage or a specific frequency of the current. In case of an emergency, like a cabin pressure drop, the sender may change the voltage for a short period and sending a second level voltage signal which is somewhat higher than the first level. The controller is adapted to recognize this short voltage peak as the desired signal to set the energy storage device into electrical connection with the activation device to activate the emergency oxygen device. The second level voltage peak signaling an emergency case may be different from a second level voltage peak signaling a test case, in particular higher than such test voltage. In an alternative embodiment the sender is the source of electrical energy and is adapted to transmit substantially constant energy from a source of electrical energy to the energy storage device at a first energy level using a specific first frequency of the level. For signaling a test case or an emergency case said first frequency may change, wherein a second frequency level signaling a test case may be different from a third frequency level signaling an emergency case, and the controller is adapted to recognize these differences. In a further alternative embodiment a test case may be signaled by a second level voltage peak and an emergency case may be signaled by a change in frequency I level supplied, or vice versa. In a further alternative embodiment a test case is signaled by an increase of the voltage and an emergency case is signaled by a reduction of the voltage of the energy transmitted from the sender to the controller and/or the energy storage device. In a further alternative embodiment the substantially constant first level energy transmission is formed by an AC current and an emergency signal and/or a test signal is signaled by a change to a DC current, or vice versa.

According to a further preferred embodiment of the emergency oxygen device said controller comprises a receiver adapted to receive said signal(s) wireless from a sender and wherein the controller is coupled to a source of electrical energy or an energy storage device integrated into the emergency oxygen device. According to this embodiment the use of signal wiring inside the aircraft cabin is omitted. This leads to a further reduction in the overall weight of the aircraft. The wireless receiver may be integral within the controller or may be a separate device. To operate the receiver, the receiver may be connected to a source of electrical energy, such as the aircraft energy system. In case of an emergency, the receiver may receive an emergency signal and direct this signal to the controller, wherein the controller is adapted to set the energy storage device into electrical contact with the activation device to activate the emergency oxygen device. In an alternative embodiment the receiver may be connected to the same source of electrical energy as the energy storage device is connected. In a further alternative embodiment the receiver is connected to the energy storage device. In a further alternative embodiment the receiver comprises an additional energy storage device which is connected to a source of electrical energy. In another further alternative embodiment the receiver comprises an energy storage device which is connected to the same source of electrical energy or the same energy supply as the first energy storage device is connected. In a further alternative embodiment the receiver is adapted to receive at least two different wireless signals, comprising an emergency signal for activating said activation device in an emergency case and a test signal for activating said activation device in a test case. By designing the receiver as a wireless receiver, the overall flexibility in designing an aircraft is enhanced. Wiring inside the aircraft cabin for the use of an emergency oxygen device is most widely omitted. Furthermore it may be desired to switch off specific emergency oxygen devices, e.g. in a case only half of the seats of an aircraft is taken by passengers. Furthermore in some cases it may be desired to have additional emergency oxygen devices, like portable emergency oxygen devices, which may also comprise a receiver for receiving and/or processing a wireless emergency signal in case of emergency.

According to a further preferred embodiment of the emergency oxygen device, said controller comprises a sensor adapted to detect a cabin decompression and to provide a cabin decompression signal to said controller and wherein the controller is preferably coupled to a source of electrical energy or to an energy storage device integrated into the emergency oxygen device. The sensor herein is adapted to measure the ambient pressure, which is the pressure inside the cabin of an aircraft. In case of a cabin pressure drop, the pressure difference between the cabin ambient pressure and the ambient pressure outside the aircraft lowers. However, preferably the sensor is adapted to send a cabin decompression signal in case of measuring a specific cabin ambient pressure. According to this embodiment signal transmission means inside the aircraft connecting components at a distance from each other are as far as possible omitted. Furthermore no wireless receiver is needed both leading to a further reduction in the overall weight of an aircraft. The sensor may be integral within the controller, and adapted to recognize an aircraft altitude switch, and to generate a signal providing the signal to the controller. The sensor and/or the controller may be connected to a source of electrical energy, like the aircraft energy system. In alternative embodiments a controller and/or the sensor are connected to the same source of electrical energy which the energy storage device is connected. In a further alternative embodiment the controller and/or the sensor are connected to an energy storage device, which may be the same energy storage device adapted to supply energy to the activation device.

According to a further preferred embodiment of the emergency oxygen device said source of electrical energy is an interface for energy transmission or an energy harvesting element. According to this embodiment an interface for energy transmission may be an interface connected to the aircraft energy system to transmit a substantially constant first level energy to the energy storage device. It may be also in an alternative embodiment an interface connected to other energy systems like the system for the cabin light or speakers in the cabin or the like. Further according to this embodiment an energy harvesting element connected to the energy storage device may be a Peltier element which is in thermal contact to a heat source, to produce electrical energy from the temperature gradient across this Peltier element. This temperature gradient may be a gradient from the temperature of the inside of the cabin to the outside of the cabin, or any other temperature gradients from heat source to another object. In an alternative embodiment the energy harvesting element may be an element adapted to convert oscillatory motion into electrical energy. Such oscillatory motion may be exerted by the passenger or crew member who is supplied with oxygen by the emergency oxygen device. Further, such harvesting elements may comprise a crank, a push button, a handle to apply the shaking force or the like. Further, it is known that during flight or ground transfer, in particular during starting and landing maneuvers of an aircraft significant vibrations are induced within the whole aircraft and induce significant oscillatory motion of any devices installed within the aircraft. According to this embodiment, such oscillatory motion may preferably be used to provide energy to the energy storage device. According to another alternative embodiment wherein a controller comprises a receiver, adapted to receive a wireless signal, the energy harvesting element is adapted to convert the radiation energy emitted by the wireless sender, into electrical energy, supplied to the energy storage device.

According to a further embodiment of the invention said energy storage device comprises at least one capacitor and/or at least one rechargeable battery. The capacitor may be a super capacitor or an ultra capacitor or the like which has preferably a high energy density and a high power density. It may also comprise additionally or alternatively a rechargeable battery like a thin film battery. In an alternative embodiment the energy storage device comprises a plurality of capacitors and/or batteries. Due to the high energy density and power density, these elements are preferred for light weight construction. Additionally they may be recharged in many circles without defects, so that a supply of energy from the energy storage device to the activation device in case of an emergency is secured.

According to another aspect of the invention, the object is achieved by providing a passenger cabin emergency oxygen device for an aircraft comprising one electrically driven activation device for activating the emergency oxygen device, at least one controller adapted for receiving and processing a signal to activate the emergency oxygen device. wherein said activation device comprises a multi-mode-latch adapted to activate the emergency oxygen device by releasing a bottom lid in at least two different modes, comprising a test-case-mode, wherein the bottom lid is released from a closed position to a restrained position and an emergency-case-mode, wherein the bottom lid is released from said closed or said restrained position to a fully open position. According to this aspect of the invention, said multi-mode-latch is associated with an activation device, adapted to activate the emergency oxygen device in at least two different modes. Such a multi-mode-latch may be driven by an electromotor, an electromagnet, a solenoid element, a piezoelectric element or the like. In the test case mode the bottom lid is only released to a limited extent.

According to this embodiment the emergency oxygen device may further comprise oxygen masks held in place by a bottom lid or a hatch or the like, wherein the bottom lid is held by the activation device and in case of activation of the emergency oxygen device the lid is opened and the oxygen masks may fall downward through a bottom opening. In such an embodiment, the test case mode would refer to a mode in which the bottom lid is retained in a restrained position, so that the oxygen masks do not fall out of a casing comprising the oxygen device and thus are not supplied to a passenger cabin of an aircraft. In contrary, in an emergency case mode, the bottom lid would be fully opened to supply a passenger cabin with oxygen masks. In an alternative embodiment the test-case-mode refers to a mode wherein the emergency oxygen device is activated, so that no oxygen would be supplied, and the emergency-case-mode would refer to a mode where the emergency oxygen device is activated so that oxygen is supplied to passengers and/or the crew of an aircraft. It is to be understood that different kinds of activation are included herewith. By applying this simple executable test on the emergency oxygen devices the security of the emergency oxygen device and also an aircraft comprising such an emergency oxygen device is enhanced.

As a further surprising advantage adapting one multi-mode-latch to comprise two different modes, in particular a test case mode and an emergency mode, reduces the maintenance costs, especially in cases when the aircraft is on ground. This serves for testing whether the bottom lid is mounted correct and without undue constraints or tensions/compressions into the airplane. Such testing is to be done in frequent times to ensure function of the emergency oxygen system as a whole. However, it is not desired to completely release the bottom lid in the course of such testing because in such case the oxygen masks are released and fall out and thus have to be packed and stored again behind the bottom lid after the test. Further, remounting the bottom lid after total release may result in improper function due to wrong assembly. These drawbacks are overcome by the multimode latch according to invention. The multimode latch restraints the release of the bottom lid in a test situation and allows easy pushing pack of the lid in to the fully closed position after such test. By this, the risk of wrong assembly after such test is significantly reduced. After running a test case mode the aircraft may be easily put into the state of normal flight conditions.

According to a further improved embodiment, an actuation device is provided which is adapted to pull the bottom lid from the position after running a test case mode into the fully closed position. This actuator may be integrated into the multi mode latch or may be a separate device. The actuator allows for easy and safe reconfiguration of all bottom lids after a functionality test and thus minimizes the risk of failure after such test.

According to a preferred embodiment of the device, said multi-mode-latch comprises a first and a second hook, wherein the first hook is adapted to retain the bottom lid in said closed position and said second hook is adapted to retain the bottom lid in said restrained position. According to this embodiment, the first hook is coupled to the activation device and the second hook is coupled to a release element which may be a plate or a panel. The activation device may be adapted to activate the device in one mode or in two different modes, e.g. a test-case-mode and an emergency-case-mode. According to the first alternative where the activation device is adapted to activate the device in one mode, the first hook is released by the activation device. The second hook then comprises two different positions, a test-position to hold the bottom lid in a restrained position and an emergency-position to release the bottom lid into a fully open position. The second hook may be brought into the two positions by pushing or pulling the release element. Alternatively it may be brought into the two positions automatically.

According to another embodiment of the device, the multi-mode-latch comprises a hook comprising a first and a second recess, wherein the first recess is adapted to retain the bottom lid in said closed position and said second recess is adapted to retain the bottom lid in said restrained position. According to this embodiment the activation device is adapted to activate the emergency oxygen device in two different modes, e.g. a test-case-mode and an emergency-case-mode. According to the test-case-mode the hook is released in a way that the bottom lid which is held in a closed position by means of the first recess opens to a restrained position where it is held by means of the second recess. According to this embodiment only one hook is required and the activation of the emergency oxygen device requires no acting of a passenger.

According to a further preferred embodiment an indicator is integrated into the device said indicator being adapted to indicate whether the bottom lid has been released in a test case mode or not. Such indicator may be a mechanical element which is released in case that the bottom lid is released and may protrude from the bottom lid or any other surface of the device to indicate such release. The indicator may automatically be retracted if the bottom lid is set back into the fully closed position or may require manual individual setting back after closing of the lid.

According to another aspect of the invention, this object is achieved by a method for activating a passenger cabin emergency oxygen device for an aircraft in a case of emergency, comprising receiving a signal to activate the emergency oxygen device by a controller, setting an electrically driven activation device into electrical connection with an energy storage device and using energy from the energy storage device to activate the emergency oxygen device. According to this method, second level high-peak energy transmission from the aircraft energy system to the emergency oxygen device is omitted in an emergency case. Instead of receiving one second level high energy peak during an emergency case, the energy storage device receives a substantially constant energy transmission from the source of electrical energy at a first energy level to store this energy. In an emergency case an emergency signal is sent to the controller, which then connects the electrically driven activation device with the energy storage device. The activation device receives the required amount of energy from the energy storage device to activate the emergency oxygen device. The source of electrical energy may be an interface connected to the aircraft energy system and/or an energy harvesting element. By supplying a substantially constant low first level energy transmission from the aircraft energy system to the energy storage device no extensive wiring adapted for high-peak energy transmission from the aircraft energy system to the electrically driven activation device is required, hence leading to a reduction of overall weight of the aircraft. In case of an emergency the saved energy from the aircraft energy system may be used for other security relevant devices in the aircraft, hence leading to an enhanced overall security of the aircraft, and the danger of breakdown of the aircraft energy system in the course of simultaneous activation of the emergency oxygen devices is significantly reduced According to another aspect of the invention this object is achieved by a method for operating a passenger cabin emergency oxygen device for an aircraft, comprising transmitting substantially constant energy at a first energy level from a source of electrical energy to at least one energy storage device in such a way, that in the energy storage device sufficient energy is stored to temporary supply energy at a second energy level which is higher than said first level to an electrically driven activation device. According to this aspect of the invention the substantially constant energy transmission at a first energy level is used to energize the energy storage device. The energy storage device preferably has such a capacity, so that in case of an emergency in the energy storage device sufficient energy is stored to activate the emergency oxygen device. When this capacity is reached, meaning when enough energy is stored, the substantially constant energy transmission at a first energy level is used as a maintenance transmission, to prevent the energy storage device of lacking energy. According to this aspect of the invention, the safety of an aircraft is improved, since the emergency oxygen device may be activated even if the aircraft energy system broke down.

BRIEF DESCRIPTION OF THE DRAWINGS

Preferred embodiments of the invention are described with reference to the figures, wherein.

DETAILED DESCRIPTION

Figure 1:
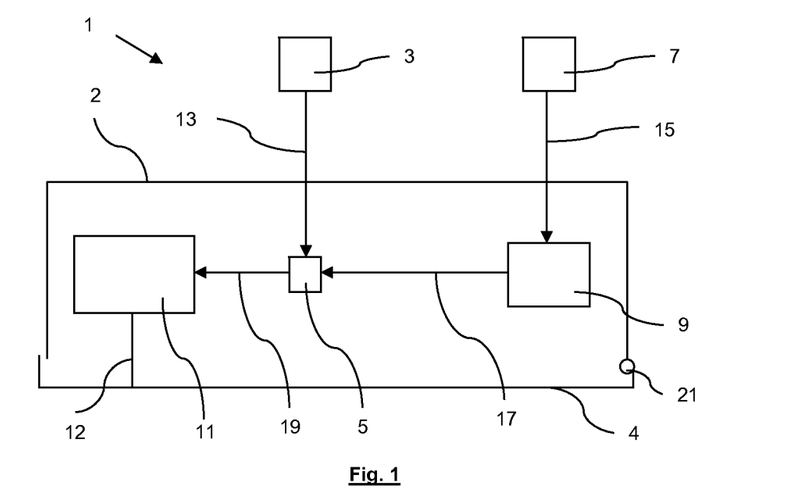
FIG. 1 is a schematic view of an emergency oxygen device according to a first embodiment of the invention.

Referring to FIG. 1, an emergency oxygen device 1 according to a first embodiment of the invention comprises an activation device 11 for activating the emergency oxygen device, a controller 5 and an energy storage device 9. These devices are encased within a housing 2 which is closed by a bottom lid 4 on its bottom side. The bottom lid 4 is attached on one side via a hinge 21 to the housing 2 on the right hand side of FIG. 1. On the opposite side, the bottom lid 4 is secured to the housing by a latch 12 attached to the activation device 11. The controller 5 is coupled to the activation device 11 and the energy storage device 9 is coupled to the controller 9 via a cable 17. Furthermore, the energy storage device 9 is coupled to a source of electrical energy 7, which in this embodiment is placed outside the housing, via an electric cable 15. The source of electrical energy 7 is adapted for substantially constant energy transmission to the energy storage device 9 at a first level. Thus, the cable 15 may be designed with a small diameter, since no high energy transmission via the cable 15 is necessary. The controller 5 is coupled to a sender 3 which is adapted to send an emergency signal or a test signal. Normally a signal is not send with a high energy, so that the signal cable 13 may also be designed with a small diameter.

In this and the following embodiments the energy storage device 9, 109, 209, 309 may be formed as a rechargeable battery or a capacitor. A rechargeable battery like a thin film battery is preferred, since it is able to store energy for a longer period than a capacitor. On the other hand a capacitor like a supercapacitor may be preferred because of its good power density. This leads to a weight reduction of the aircraft. Both, the battery and the capacitor, may comprise a housing with specific ports for the connection of the cables 15, 17, 115, 117, 215, 217, 314, 317.

In case, the sender 3 is sending an emergency signal via the cable 13 to the controller 5, the controller sets the energy storage device 9 into communication with the activation device 11 via the cables 17, 19 to activate the emergency oxygen device 1. The activation device will release the latch 12, and the bottom lid 4 opens following gravity force. For releasing and/or activating the latch 12, the activation device 11 may comprise an electric motor or a piezo-activator. Also an electromagnetic switch or the like could be implemented. Oxygen masks (not shown) may be stored directly above the lid 4, so that in case the lid 4 opens, the oxygen masks are supplied to passengers inside the aircraft. In this embodiment the sender 3 may be an cabin pressure sensor adapted to measure the cabin pressure or may also be a manual sender activated by the cabin crew. The source of electrical energy 7 in this embodiment may be an interface to the aircraft energy system or any other source of electrical energy.

Figure 2:
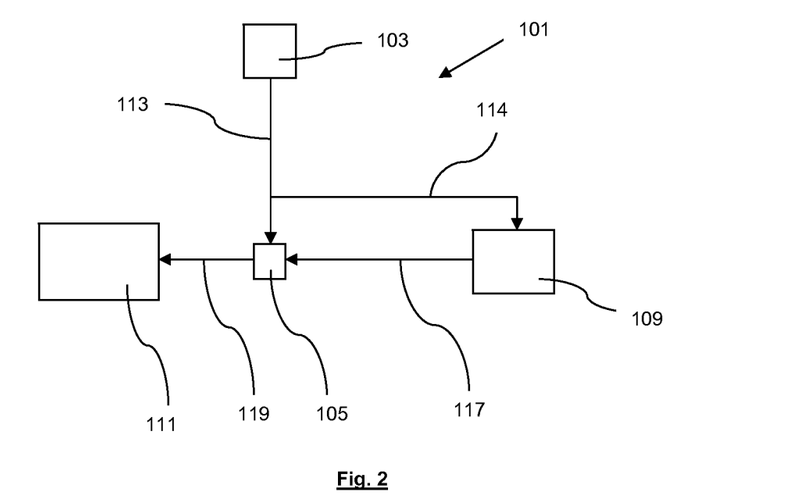
FIG. 2 is a schematic view of an emergency oxygen device according to a second embodiment of the invention.

In a second embodiment of the emergency oxygen device 101 shown in FIG. 2, the energy storage device 109 is coupled via a cable 114 to the sender 103. Furthermore in this embodiment the controller 105 is coupled to the sender 103 and the activation device 111 is coupled to the controller. By connecting the energy storage device 109 to the sender 103, the energy storage device 109 receives the electrical energy to be stored from the sender 103. The sender 103 is adapted for a substantially constant voltage and low current amplitude transmission at a first energy level. The energy storage device 109 stores this electrical energy until a specific amount of energy is stored. The constant energy transmission is then used as a maintenance voltage for the energy storage device 109. In case of an emergency, the sender 103 will send a short high peak voltage signal. The controller 105 recognizes this difference voltage and sets as a result the energy storage device 109 into electrical communication with the activation device 111.

In FIG. 2 no housing of the emergency oxygen device 101 is shown. However, preferably the emergency oxygen device 101 or at least parts of it are encased in housing. In an alternative embodiment the activation device 111 may also be arranged outside a housing and coupled to a latch to activate the emergency oxygen device by releasing a bottom lid of a housing as shown in FIG. 1.

Figure 3:
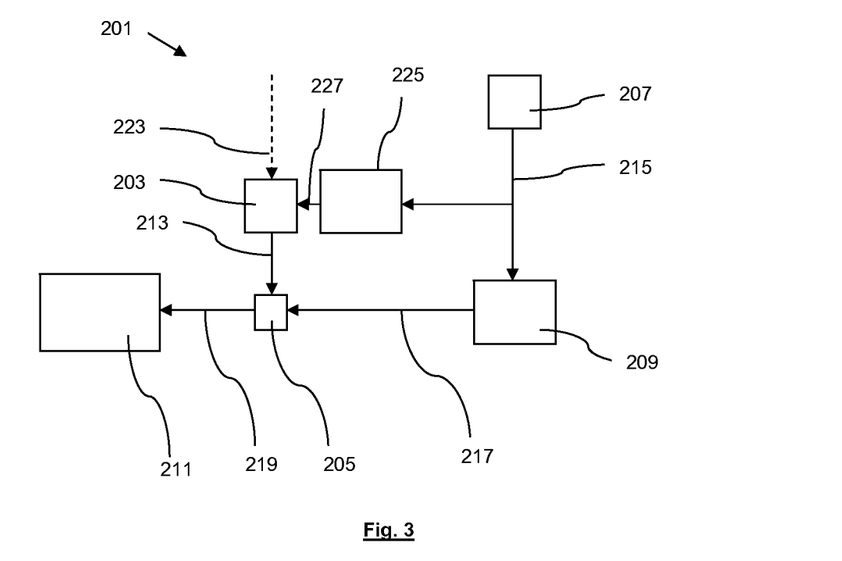
FIG. 3 is a schematic view of an emergency oxygen device according to a third embodiment of the invention.

Referring to FIG. 3 a third embodiment comprises a wireless receiver 203, a first energy storage device 209 and a second energy storage device 225. The first energy storage device 209 is coupled to the controller 205 via a cable 217. The second energy storage device 225 is coupled to the wireless receiver 203 via a cable 227. In an alternative embodiment it may also be integral with the wireless receiver 203. Both energy storage devices 229, 225 are coupled to a source of electrical energy 207. This source of electrical energy 207 may be the aircraft energy system or any other source of electrical energy. Preferably the source of electrical energy 207 is an energy harvesting element. Such an energy harvesting element 207 may be attached to a housing of the emergency oxygen device 211 and adapted to convert mechanical energy acting onto such a housing from vibrations, accelerations or the like into electrical energy. The energy harvesting element 207 may comprise an inductive coil with a moveable magnetic core arranged within the coil and biased via a mechanical spring to thus allow induction of electrical energy within the coil in case that the housing and the energy harvesting element 207 is exposed to an oscillatory motion effecting movement of the core in the relation to the coil.

The electrical energy generated within the energy harvesting element 207 is supplied via a cable 215 to the first and second energy storage device 209, 255. Thus, the wireless receiver is supplied with energy from the second energy storage device 227 and the activation device is supplied with energy from the first energy storage device 209 in case of an emergency.

It is preferred to implement two separate energy storage devices 209, 225 since in case of an emergency, it is crucial that inside the first energy storage device 209 sufficient energy is stored for an activation of the activation device 211. However in an alternative embodiment the wireless receiver 203 and the controller 205 are coupled to the same energy storage device. In such an embodiment it is necessary to secure, that to any time the amount of stored energy is sufficient to run the activation device 211.

The wireless signal 223 is send to the wireless receiver 203 from a sender inside the aircraft. The sender may be coupled to a sensor and/or adapted for manual activation, e.g. by the cabin crew. In an alternative embodiment the wireless receiver 203 is integral with the controller. Thus, the frame size of the emergency oxygen device may be kept small.

Figure 4:
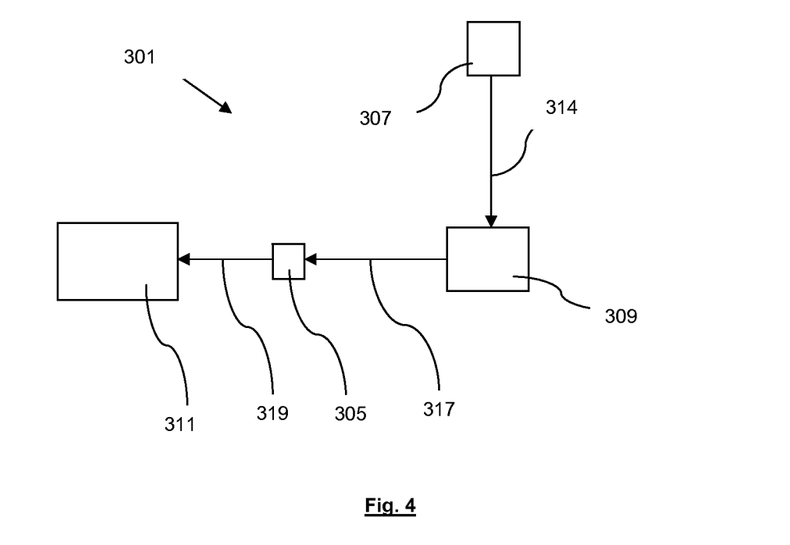
FIG. 4 is a schematic view of an emergency oxygen device according to a fourth embodiment of the invention.
Figure 5:
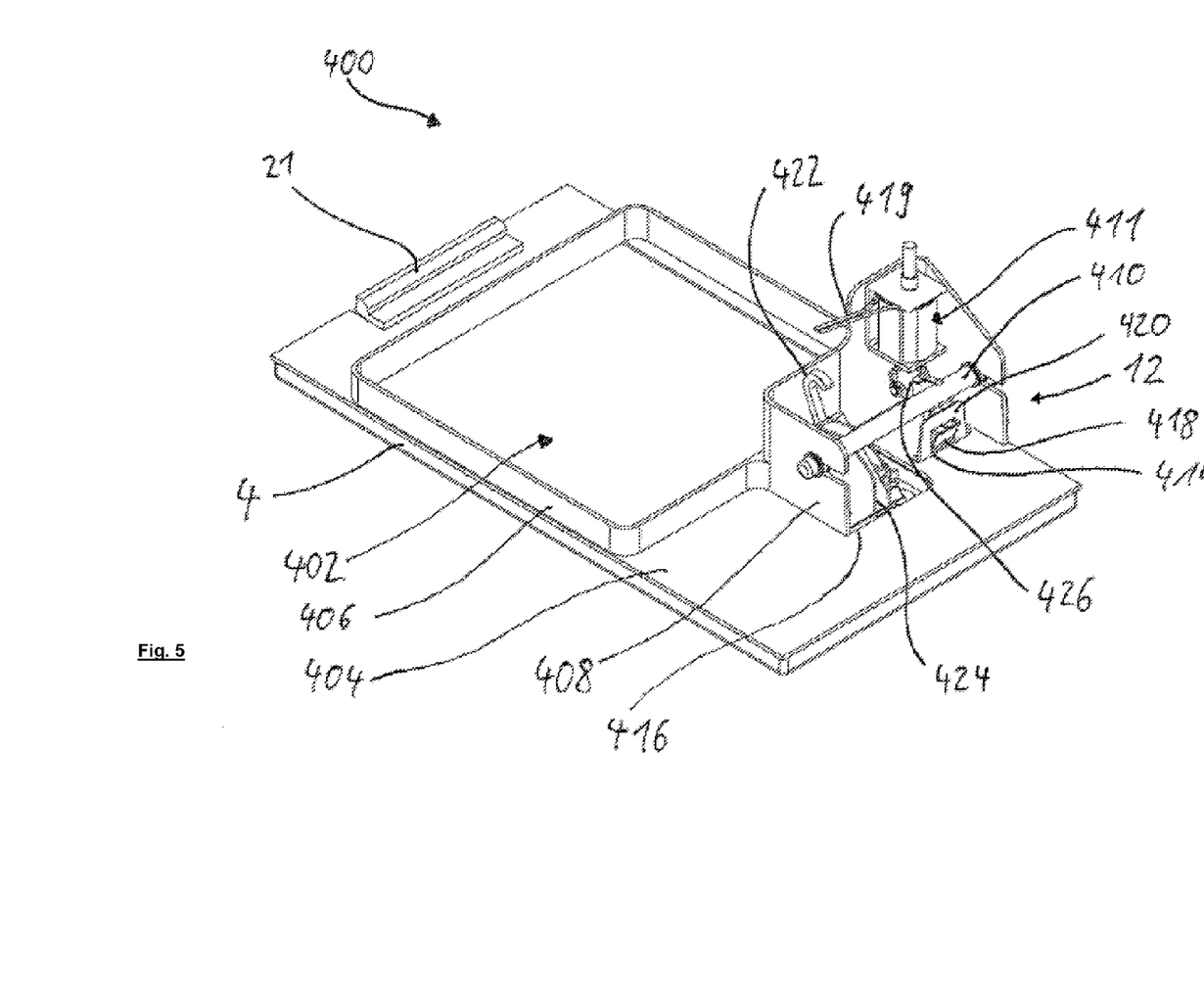
FIG. 5 is a schematic partial view of a frame with a latch for an emergency oxygen device in a closed position.

Referring to FIG. 4 a fourth embodiment the emergency oxygen device 301 comprises a controller 305 with an integrated sensor. In this embodiment, the energy storage device 309 is coupled with the controller 305 via a cable 317 and to a source of an electrical energy 307, which may be the aircraft energy system or a harvesting element as described above. In case the integrated sensor within the controller 305 measures a low cabin altitude pressure, which makes it necessary to supply the passengers with oxygen, the controller 305 sets the energy storage device 309 into electrical connection with the activation device 311 to activate the emergency oxygen device 301. All these elements may be incased in one housing, which is preferred. This leads to a reduction in production costs since the complexity of assembling the emergency oxygen device 1, 101, 201, 301 into an aircraft is reduced.

In case of a sudden pressure drop within a cabin of an aircraft, the emergency oxygen device 1, 101, 201, 301 according to the invention will work as follows. After having received an emergency signal via a signal cable 13, 113, a wireless signal way 223 or by the sensor integral within the controller 305, the controller 5, 105, 205, 305 sets the energy storage device 9, 109, 209, 309 into electrical contact with the activation device 11, 111, 211, 311. Thus electrical energy flows via the cables 17, 19, 117, 119, 217, 219, 317, 319 from the energy storage device to the activation device. Parallel to this, the controller sends a signal to the activation device, to fully activate the emergency oxygen device 1, 101, 201, 301. A full activation herein refers to activation, where a bottom lid 4 of a housing 2 is opened, so that oxygen masks are provided to passengers and also a flow of oxygen to the masks is supplied. A not fully activation hence refers to an activation, wherein such a bottom lid 4 is retained in a restrained position.

In case a test on the emergency oxygen device 1, 101, 201, 301 should be taken out, the workflow follows the same steps as explained above, but with the difference, that the sender 3, 103 sends a test signal to the controller 5, 105, 205, 305 or the wireless receiver 203. The controller 5, 105, 205, 305 then sets the energy storage device 9, 109, 209, 309 into electrical contact with the activation device 11, 111, 211, 311 and also sends a signal to not fully activate the emergency oxygen device 1, 101, 201, 301. Hence the emergency oxygen device 1, 101, 201, 301 is not fully activated by the activation device 11, 111, 211, 311. An incomplete activation herein refers to an activation where the bottom lid 4 is retained in a restrained position, so that the oxygen masks stay inside the device and are not supplied to passengers. In this test case no oxygen flows to the masks. In an alternative embodiment the emergency oxygen device 1, 101, 201, 301 comprises a lamb or other signaling means, which are activated to signal that the emergency oxygen device 1, 101, 201, 301 is working correctly.

Figure 6:
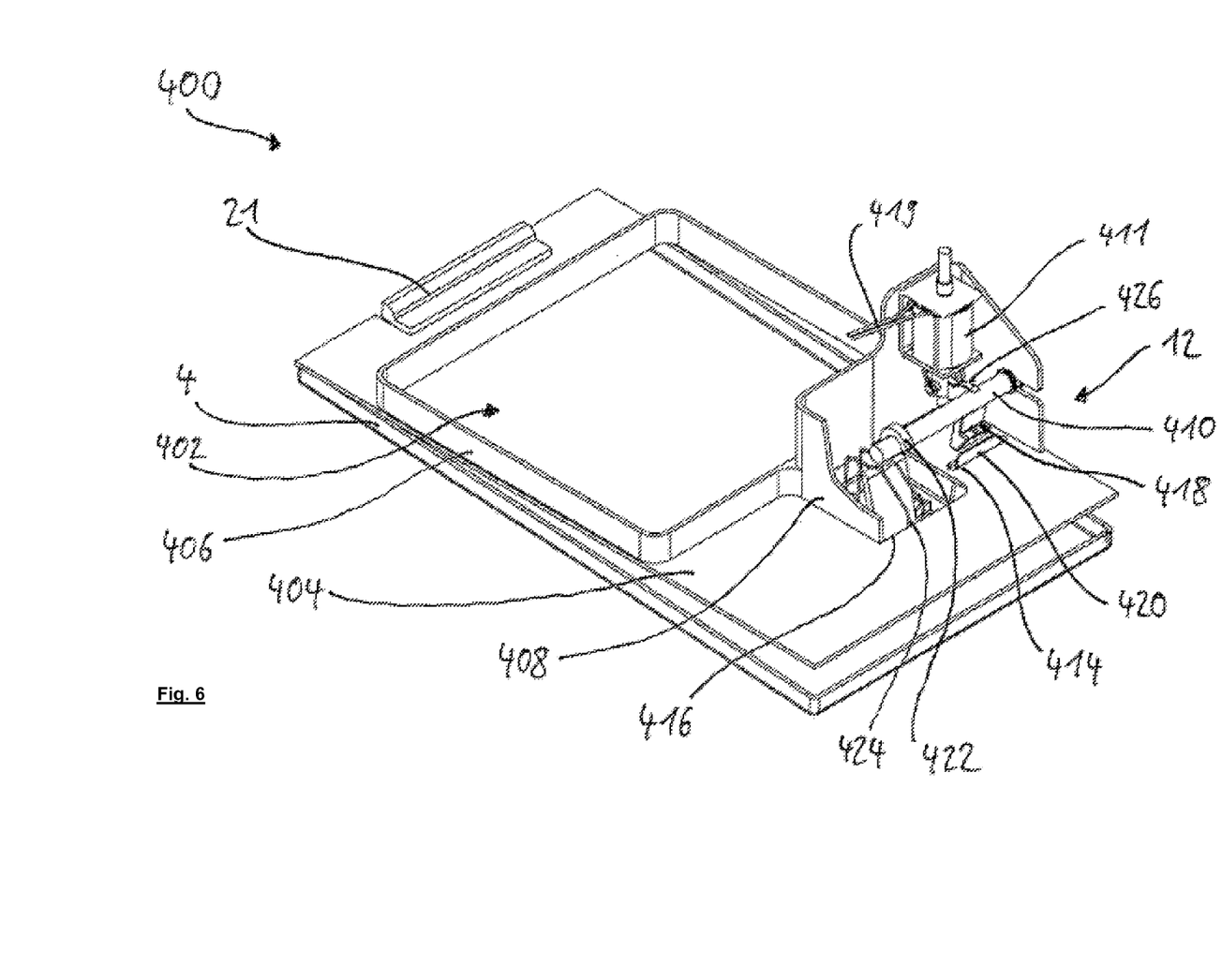
FIG. 6 is a schematic partial view of a frame with a latch for an emergency oxygen device in a restrained position.
Figure 7:
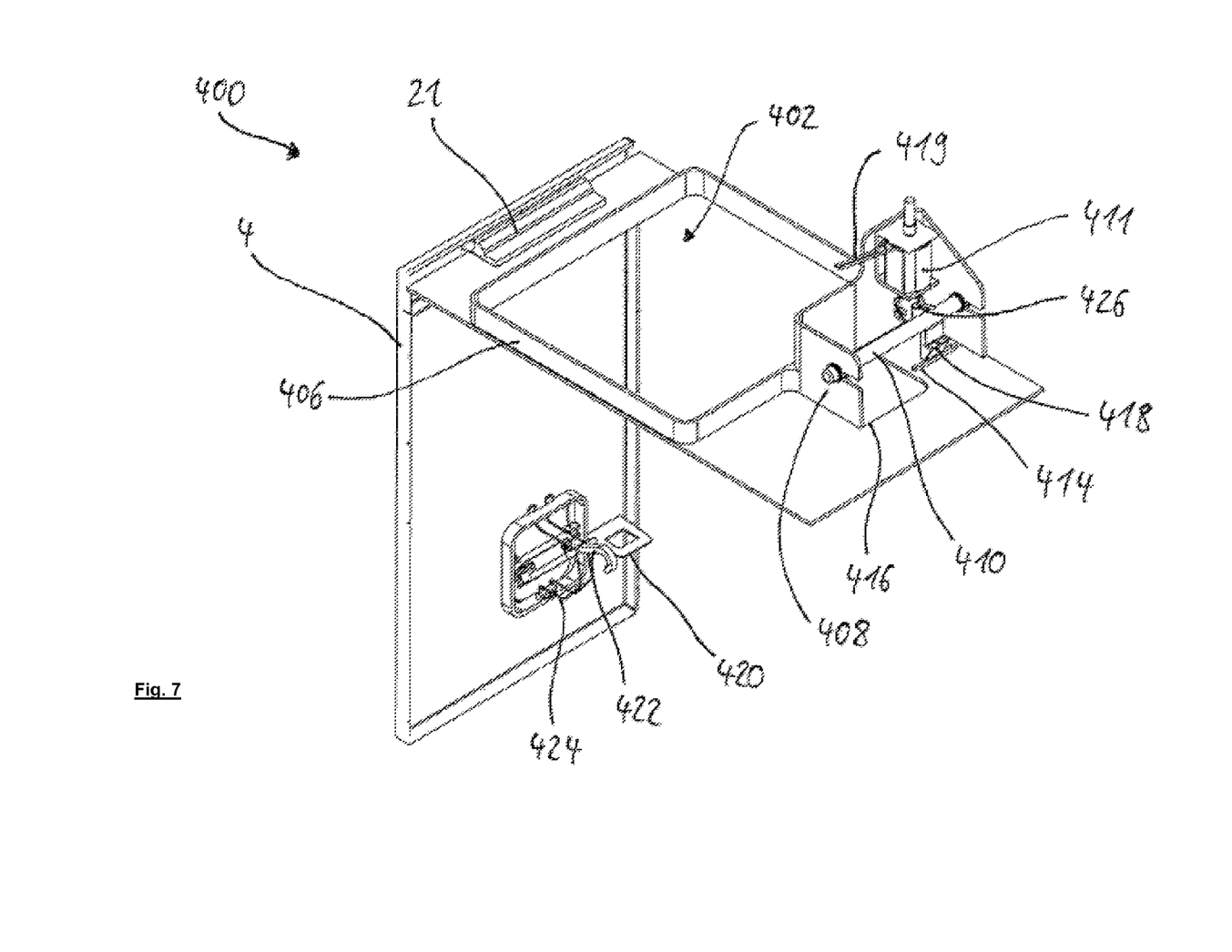
FIG. 7 is a schematic partial view of a frame with a latch for an emergency oxygen device in a fully opened position.
Figure 8:
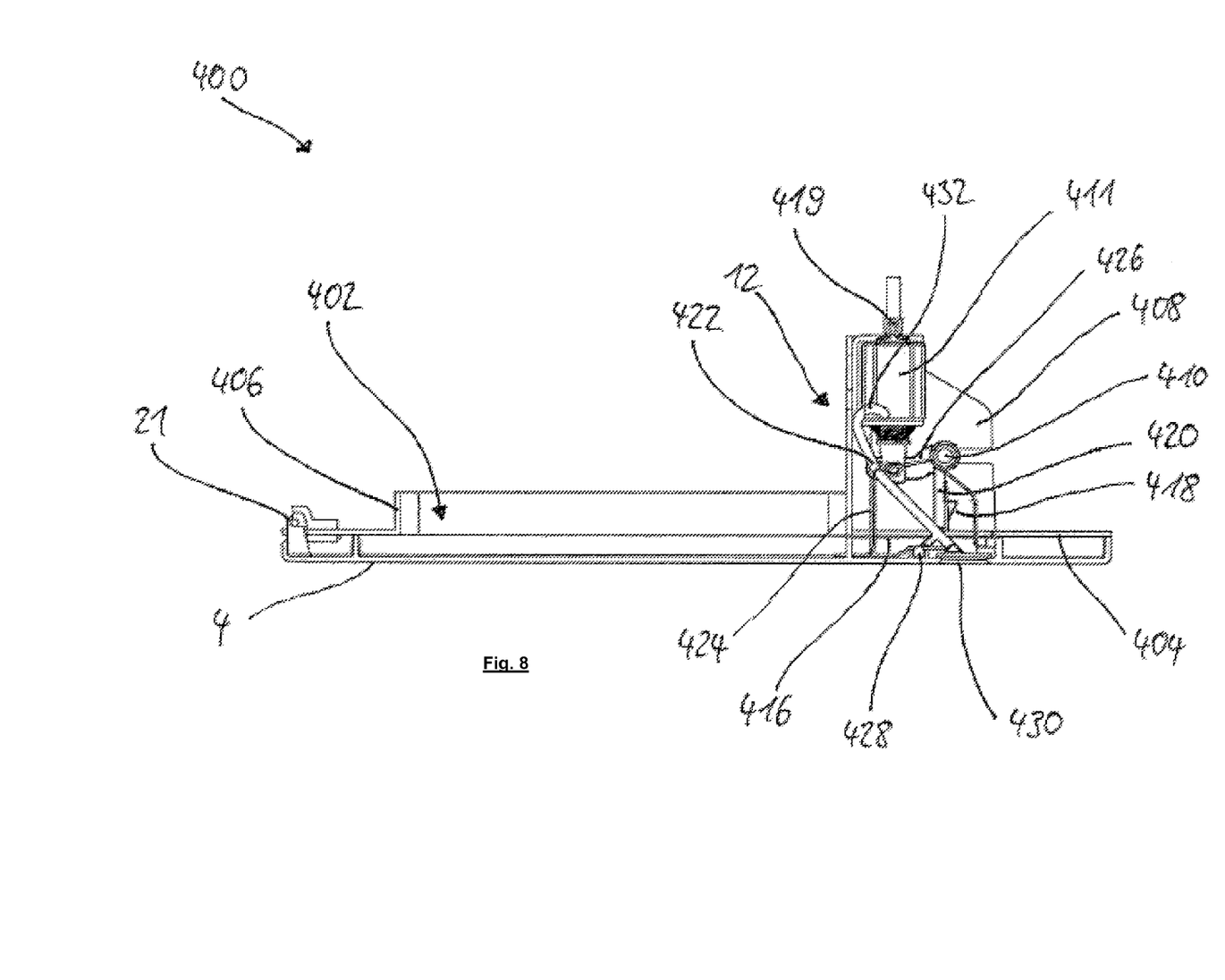
FIG. 8 is a cross-sectional view of a frame with a latch for an emergency oxygen device in a closed position.
Figure 9:
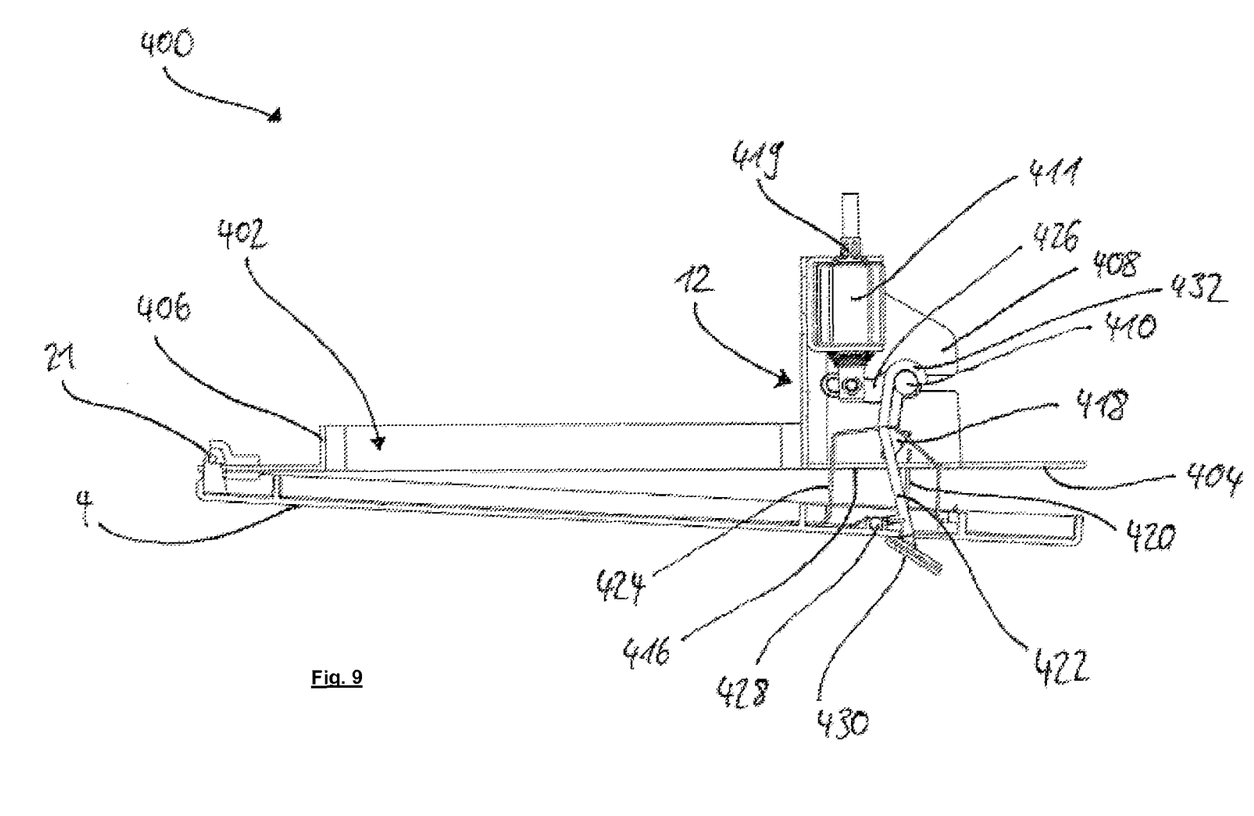
FIG. 9 is a cross-sectional view of a frame with a latch for an emergency oxygen device in a restrained position.
Figure 10:
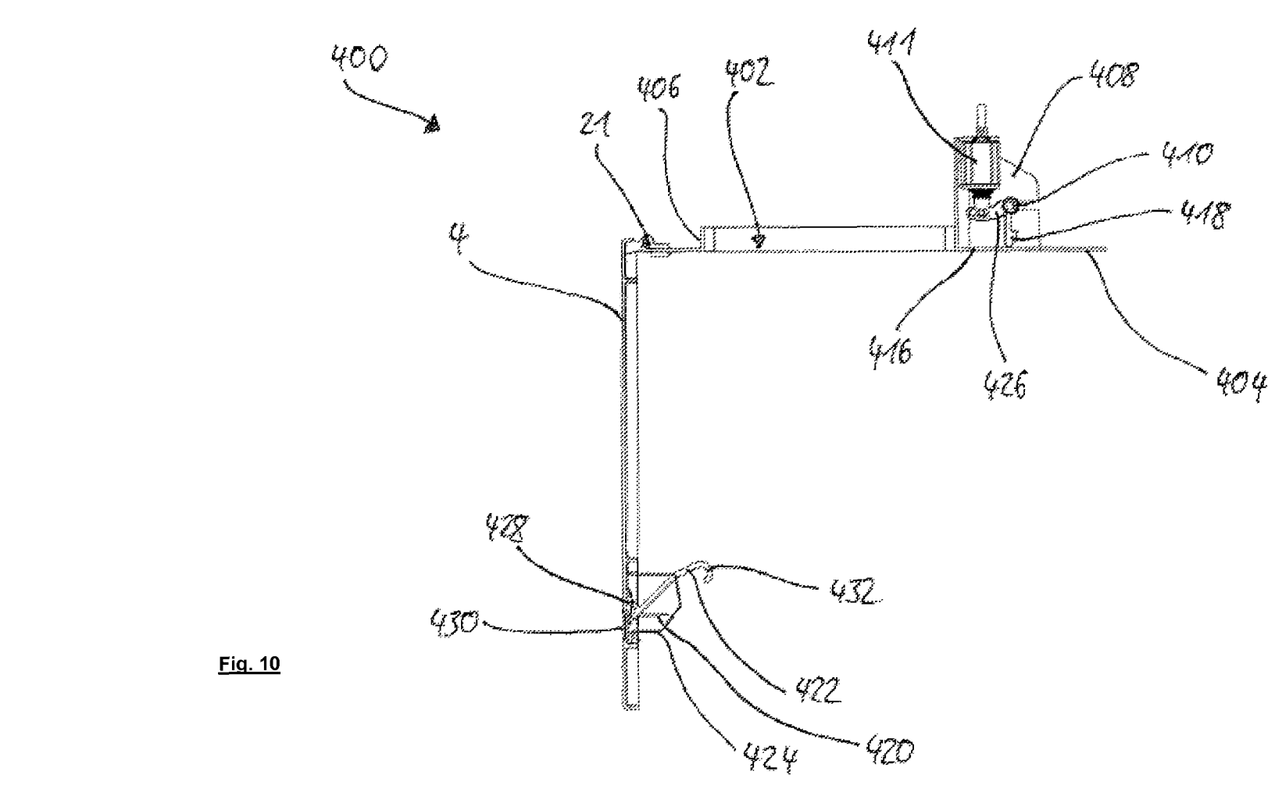
FIG. 10 is a cross-sectional view of a frame with a latch for an emergency oxygen device in a fully opened position.

Referring to FIGS. 5 to 10, a frame 400 for an emergency oxygen device 1, 101, 201, 301, which may be part of the emergency oxygen device, is shown in detail. The frame 400 comprises a bottom panel 404 with an opening 402 which is encircled by a rim 406. On one side of the bottom panel 404 holding means 408 are mounted. On the opposite side, a bottom lid 4 is pivotally fixed by a hinge 21 on one end of the bottom panel. In a closed position (FIG. 5, 8) the bottom lid locks the opening 402. Above the bottom lid oxygen masks (not shown) may be stored, which may fall through the opening 402 upon release of the bottom lid 4 (FIG. 7, 10).

Furthermore the frame 400 comprises a latch 12. The latch 12 in this embodiment comprises a first hook 418 and a second hook 422. The first hook 418 works together with an eye 420. Both are substantially oriented perpendicular to the bottom panel 404. The eye 420 is fixed to the bottom lid 4 and extends through an opening 414 in the bottom panel 404 when the bottom lid 4 is in a closed position. The first hook 418 is connected to a lever 426 wherein both are pivotally mounted by means of a bar 410 relative to the holding means 408. The lever 426 is pivotally mounted to the activation device 411, which in this embodiment is carried out as an electromagnetic element. The activation device 411 is fixed to the holding means 408 and connected to a source of electrical energy or a controller (both not shown) by means of a cable 419 for high energy transmission.

The latch 12 or latching mechanism 12 comprises a second hook 422. As seen best in FIGS. 8 to 10, the second hook 422 is pivotally mounted to the bottom lid 4 by means of a pivot 428. On one end of the second hook 422 a release panel 430 is arranged. In a closed position of the bottom lid 4, the release panel 422 is substantially flush-mount to the surface of the bottom lid 4. The second hook 422 is hold in this position by means of a guidance spring 424, which is fixed to the bottom lid 4. In a closed position of the bottom lid 4 the guidance spring 424 acts against the bar 410. Both, the second hook 422 and the guidance spring 424 extend trough an opening 416 in the bottom panel 404.

In case the first hook 418 is released the bottom lid 4 is forced to open by means of the guidance spring 424. Upon the relaxation o the spring 424, the second hook 422 may tilt around its pivot 428. A curved end 432 of the second hook 422 is adapted to engage with the bar 410, hence the bottom lid 4 is retained in a restrained position (FIG. 6, 9). Since the second hook 422 is pivoted the release panel 430 is no longer flush-mount to the surface of the bottom lid 4. By pushing the release panel 430, the curved end 432 of the second hook 422 is disengaged of the bar 410 and hence the bottom lid 4 may open fully (FIG. 7, 10).

The invention claimed is:

1. A passenger cabin emergency oxygen device for an aircraft, comprising:
   at least one electrically driven activation device for activating the emergency oxygen device;
   at least one energy storage device for storing electrical energy and supplying said electrical energy to the at least one activation device;
   at least one controller adapted for receiving a signal to activate the emergency oxygen device;
   a source of electrical energy,
   wherein said source of electrical energy and said energy storage device are coupled together for substantially constant energy transmission from the source of electrical energy to the energy storage device at a first energy level,
   wherein said activation device and said controller are coupled together for signal transmission from the controller to the activation device,
   wherein said activation device and said energy storage device are coupled together for energy transmission from the energy storage device to the activation device at a second energy level which is higher than the first energy level,
   wherein said activation device, said energy storage device and said controller build one single unit adapted to be inserted into a roof element of an aircraft cabin interior.

2. The device according to claim 1, wherein said controller is adapted to
   receive and process an emergency signal, in particular a cabin decompression signal;
   set the activation device and the energy storage device into electrical connection, preferably by activating a switch.

3. The device according to claim 1, wherein said controller is adapted to receive said signal via a signal-wire from a sender.

4. The device according to claim 1, wherein said source of electrical energy and said energy storage device are coupled together by means of said signal-wire for an energy transmission at said first energy level.

5. The device according to claim 1, wherein said controller is adapted to receive and process at least two different signals comprising:
   an emergency signal for activating said activation device in an emergency case;
   a test signal for activating said activation device in a test case.

6. The device according to claim 3, wherein said signal comprises a change of voltage and/or a change of frequency of an electrical current of said signal-wire and preferably that the change of voltage and/or the change of frequency signalling the emergency signal is different to the change of voltage and/or the change of frequency signalling the test signal.

7. The device according to claim 1, wherein said controller comprises a receiver adapted to receive said signal(s) wireless from a sender and wherein the controller is coupled to a source of electrical energy or to an energy storage device integrated into the emergency oxygen device.

8. The passenger cabin emergency oxygen device of an aircraft according to claim 1, wherein said controller comprises a sensor adapted to detect a cabin decompression and to provide a cabin decompression signal to said controller and wherein the controller is coupled to a source of electrical energy or to an energy storage device integrated into the emergency oxygen device.

9. The device according to claim 1, wherein said energy storage device comprises at least one capacitor or at least one rechargeable battery.

10. An aircraft, comprising a plurality of emergency oxygen devices,
wherein at least one emergency oxygen device, preferably a plurality of said plurality of emergency oxygen devices is designed according to any of the features of the claim 1.

* * * * *